United States Patent
Zheng et al.

(10) Patent No.: US 12,252,061 B2
(45) Date of Patent: Mar. 18, 2025

(54) CONTAINER LOCKING DEVICE AND PIGGYBACK TRANSPORT VEHICLE

(71) Applicants: CRRC QIQIHAR ROLLING STOCK CO., LTD., Heilongjiang (CN); CHINA SHENHUA ENERGY COMPANY LIMITED, Beijing (CN); SHEN HUA RAILWAY EQUIPMENT COMPANY LIMITED, Beijing (CN)

(72) Inventors: Heping Zheng, Heilongjiang (CN); Meng Wang, Heilongjiang (CN); Zhihong Bian, Heilongjiang (CN); Hongkun Wang, Heilongjiang (CN); Wengang Wang, Heilongjiang (CN); Qiqi Fang, Heilongjiang (CN); Yuxing Lu, Heilongjiang (CN); Chao Dong, Heilongjiang (CN); Hua Li, Heilongjiang (CN); Rongkun Wu, Heilongjiang (CN); Tianjun Zhao, Heilongjiang (CN); Yong Fu, Heilongjiang (CN); Zhenguo Wu, Heilongjiang (CN); Caiyu Shen, Heilongjiang (CN); Bo Yuan, Heilongjiang (CN)

(73) Assignees: CRRC QIQIHAR ROLLING STOCK CO., LTD., Heilongjiang (CN); CHINA SHENHUA ENERGY COMPANY LIMITED, Beijing (CN); SHEN HUA RAILWAY EQUIPMENT COMPANY LIMITED, Beijing (CN)

( * ) Notice: Subject to any disclaimer, the term of this patent is extended or adjusted under 35 U.S.C. 154(b) by 421 days.

(21) Appl. No.: 17/434,875

(22) PCT Filed: Aug. 21, 2020

(86) PCT No.: PCT/CN2020/110583
§ 371 (c)(1),
(2) Date: Aug. 30, 2021

(87) PCT Pub. No.: WO2021/109623
PCT Pub. Date: Jun. 10, 2021

(65) Prior Publication Data
US 2022/0348131 A1 Nov. 3, 2022

(30) Foreign Application Priority Data
Dec. 3, 2019 (CN) .......................... 201911223429.6

(51) Int. Cl.
*B60P 7/13* (2006.01)
*B61D 3/00* (2006.01)
(Continued)

(52) U.S. Cl.
CPC ................ *B60P 7/13* (2013.01); *B61D 3/005* (2013.01); *B61D 3/184* (2013.01); *B61D 3/20* (2013.01); *B61D 45/007* (2013.01)

(58) Field of Classification Search
CPC ........... B60P 7/13; B61D 3/005; B61D 3/184; B61D 3/20; B61D 45/007
(Continued)

(56) References Cited

U.S. PATENT DOCUMENTS 1,743,387 A * 1/1930 Perin .......................... B60P 7/13
410/67
2,021,503 A * 11/1935 Fildes ....................... B60P 7/13
414/572
(Continued)

FOREIGN PATENT DOCUMENTS

CN 201347073 11/2009
CN 201932173 8/2011
(Continued)

OTHER PUBLICATIONS

Extended European Search Report issued in App. No. EP20895486.7, dated Mar. 16, 2022, 7 pages.
(Continued)

*Primary Examiner* — Hilary L Gutman
(74) *Attorney, Agent, or Firm* — Riverside Law LLP

(57) ABSTRACT

A container locking device and a piggyback transport vehicle are provided. The container locking device includes:
(Continued)

a support, the support being provided with an accommodating space; a locking structure, a first end of the locking structure being hinged with the support, the locking structure having a locking position extending out of the accommodating space and an avoiding position retracted into the accommodating space; and a support structure, a first end of the support structure being hinged with a second end of the locking structure; wherein in a direction away from the locking structure, the support structure has a retraction position and a support position which cooperates with the support.

12 Claims, 20 Drawing Sheets

(51) Int. Cl.
  *B61D 3/18* (2006.01)
  *B61D 3/20* (2006.01)
  *B61D 45/00* (2006.01)
(58) Field of Classification Search
  USPC .......................................................... 410/77
  See application file for complete search history.

(56) References Cited

U.S. PATENT DOCUMENTS

| | | | | |
|---|---|---|---|---|
| 2,956,835 | A | * | 10/1960 | Rogers ..................... B60P 7/13 410/77 |
| 3,014,604 | A | | 12/1961 | Loomis |
| 3,085,518 | A | * | 4/1963 | Szczepanik .......... B61D 45/007 410/58 |
| 3,498,238 | A | * | 3/1970 | Sweger ................. B61D 45/007 410/70 |
| 3,986,460 | A | | 10/1976 | Voigt et al. |
| 4,349,302 | A | * | 9/1982 | Ferguson, Jr. .......... B64D 9/003 410/79 |
| 5,356,250 | A | | 10/1994 | Vogg et al. |
| 2002/0131837 | A1 | | 9/2002 | Segura |
| 2022/0162042 | A1 | * | 5/2022 | Cox ...................... B60P 1/6463 |

FOREIGN PATENT DOCUMENTS

| | | | | |
|---|---|---|---|---|
| CN | 103707895 | | 4/2014 | |
| CN | 104442878 A | * | 3/2015 | ........... B61D 45/007 |
| CN | 204341037 U | | 5/2015 | |
| CN | 204341068 | | 5/2015 | |
| CN | 104802817 A | | 7/2015 | |
| CN | 205686408 | | 11/2016 | |
| CN | 107697814 | | 2/2018 | |
| CN | 207128892 U | * | 3/2018 | ............. B61D 3/184 |
| CN | 207128893 U | * | 3/2018 | |
| CN | 208217538 | | 12/2018 | |
| CN | 110884513 A | * | 3/2020 | ............. B61D 3/184 |
| CN | 110884517 A | | 3/2020 | |
| CN | 110949422 A | * | 4/2020 | ............. B61D 3/184 |
| CN | 111361587 A | * | 7/2020 | ............. B61D 3/182 |
| CN | 211592556 U | * | 9/2020 | ............. B61D 3/184 |
| CN | 212148844 U | * | 12/2020 | ............. B61D 3/182 |
| CN | 112298570 A | * | 2/2021 | ................ B60P 7/13 |
| DE | 4412085 A1 | | 10/1995 | |
| DE | 19548803 C1 | | 2/1997 | |
| EP | 0131984 A2 | * | 1/1985 | |
| EP | 0921970 B1 | * | 8/2001 | |
| EP | 1136339 A1 | | 9/2001 | |
| FR | 2541211 A1 | * | 8/1984 | |
| GB | 547531 A | | 9/1942 | |
| GB | 2261907 A | | 6/1993 | |
| GB | 2334996 A | | 9/1999 | |

OTHER PUBLICATIONS

International Search Report (ISR) for PCT/CN2020/110583 mailed Nov. 4, 2020.

* cited by examiner

CONTAINER LOCKING DEVICE AND PIGGYBACK TRANSPORT VEHICLE

CROSS-REFERENCE TO RELATED APPLICATIONS

This application is a U.S. National Phase application filed under 35 U.S.C. § 371 claiming benefit to International Patent Application No. PCT/CN2020/110583, which is filed on Aug. 21, 2020, and claims the priority of Chinese Patent Application No. 201911223429.6, to the National Intellectual Property Administration, PRC on Dec. 3, 2019 and entitled "Container Locking Device and Piggyback Transport Vehicle", the entire contents of each of which are incorporated herein by reference in their entirety.

TECHNICAL FIELD

The present disclosure relates to a technical filed of transportation equipment, and in particular, relates to a container locking device and a piggyback transport vehicle.

BACKGROUND

In order to enable a piggyback transport vehicle to transport various kinds of cargos, and to be used for both transporting highway semi-trailers or highway trucks and transporting containers, container locking devices need to be provided on the piggyback transport vehicle, and when containers are not transported, the container locking devices cannot interfere with the highway semi-trailers or highway trucks, thereby ensuring that the highway semi-trailers or highway trucks can be reliably driven into or out of a concave chassis.

In the related art, the container locking devices on the piggyback transport vehicle are of an outward-overturning type. For example, in a patent with publication no. CN 207128892 U, when the outward-overturning container locking device switches between a locking position and an avoiding position, a rotary arm needs to rotate outward, which requires a large space; moreover, on high platforms or within building boundary regions, the outward-overturning container locking device cannot switch between the locking position and the avoiding position, which results in certain limitations to sites where the piggyback transport vehicle loads or unloads cargos. In addition, the outward-overturning container locking device is a cantilever structure which has a poor force receiving state, causing poor performance of the container locking device.

SUMMARY

The main purpose of some embodiments of the present disclosure is to provide a container locking device and a piggyback transport vehicle, so as to solve the problem in the related art that the container locking device is an outward-overturning cantilever structure, thereby affecting the performance of the container locking device.

In order to achieve the described object, according to some embodiments of the present disclosure, a container locking device is provided, wherein the container locking device includes: a support, the support being provided with an accommodating space; a locking structure, a first end of the locking structure being hinged with the support, the locking structure having a locking position extending out of the accommodating space and an avoiding position retracted into the accommodating space; and a support structure, a first end of the support structure being hinged with a second end of the locking structure; wherein in a direction away from the locking structure, the support structure has a retraction position and a support position which cooperates with the support; when the locking structure is located at the locking position, the support structure is located at the support position and the locking structure is caused to stay at the locking position; and when the locking structure is located at the avoiding position, the support structure is located at the retraction position and is retracted into the accommodating space.

In some alternative embodiments, the support is provided with a clamping groove in communication with the accommodating space, and the clamping groove is located below the first end of the support structure; and when the support structure is located at the support position, a second end of the support structure is snap-fitted with the clamping groove, and the first end of the locking structure, the first end of the support structure and the second end of the support structure form a triangle.

In some alternative embodiments, the support further includes a guide groove in communication with the clamping groove, and the guide groove extends along a movement trajectory of the second end of the support structure.

In some alternative embodiments, the support includes a first side plate and two second side plates, the two second side plates are provided on the first side plate at an interval in a first direction, and the first side plate and the two second side plates enclose the accommodating space; the container locking device further includes a first rotary shaft, two ends of the first rotary shaft being respectively connected to the two second side plates; the first end of the locking structure is provided with a first mounting hole, and the locking structure is pivotably sleeved on the first rotary shaft through the first mounting hole; and a locking head cooperating with a container is provided on a surface, away from the first side plate, of the second end of the locking structure.

In some alternative embodiments, two first assembly holes are provided, each of the two second side plates is provided with one first assembly hole in the two first assembly holes, and two ends of the first rotary shaft respectively penetrate through the two first assembly holes; a limiting groove extending in a radial direction of the first rotary shaft is provided on an outer circumferential surface of the first rotary shaft; and the container locking device further includes a clamping plate fitting the limiting groove, at least a part of the clamping plate extends into the limiting groove, and the clamping plate is connected with one second side plate in the two second side plates by a first connecting member, so that the first rotary shaft is fixedly connected with the support.

In some alternative embodiments, a groove is provided on a surface, close to the first side plate, of the locking structure, and the groove is usable for accommodating the support structure; two second assembly hole are provided, and one of the two second assembly holes is provided on each of two second groove side walls, provided in the first direction, of the groove; a first connecting hole is provided on a first groove side wall, away from the first mounting hole, of the groove; the locking device further includes: a second rotary shaft, two ends of the second rotary shaft respectively penetrating through the two second assembly holes, and a second connecting hole provided opposite to the first connecting hole being provided on an outer peripheral wall of the second rotary shaft; and a second connecting member, the second connecting member penetrating through the first connecting hole and the second connecting hole, so that the second rotary shaft is fixedly connected with the locking structure; the first end of the support structure is provided with a second mounting hole, and the support structure is pivotably sleeved on the second rotary shaft through the second mounting hole; and an avoiding hole for avoiding the second connecting member is provided on a hole wall of the second mounting hole.

In some alternative embodiments, the avoiding hole is of fan-shaped.

In some alternative embodiments, a rotation hole is provided on an axial end face of the second rotary shaft, and a hole wall face of the rotation hole includes a transmission plane to drive, through the rotation hole, the second rotary shaft to rotate, so that the second connecting hole is provided opposite to the first connecting hole.

In some alternative embodiments, the support further includes: vertical plates, one of the vertical plates being provided on each of surfaces, opposite to each other, of the two second side plates, and each of the vertical plates being provided with the clamping groove and the guide groove; wherein two support columns are provided at the second end of the support structure, and the two support columns respectively cooperate with the two guide grooves; or the two support columns respectively cooperate with the two clamping grooves.

In some alternative embodiments, the support further includes an upper cover plate, the upper cover plate being connected to top ends of the two second side plates and a top end of the first side plate; top ends of the vertical plates and the upper cover plate are provided at intervals; the first side plate is provided with an avoiding hole for avoiding the locking structure; or the first side plate is provided with an avoiding hole for avoiding the support structure; or the first side plate is provided with an avoiding hole for avoiding the locking structure and the support structure; when the locking structure is located at the avoiding position and the support structure is located at the retraction position, a mounting space is formed between the planes where two side faces of the upper cover plate are located, and the locking structure and the support structure are located within the mounting space; a groove bottom wall of each of the guide grooves is of arc-shaped, and with respect to the clamping grooves, the guide grooves are provided closer to the first side plate; each of the vertical plate includes an anti-detachment boss, the anti-detachment boss being located at a groove opening of the clamping groove and located at a side away from the first side plate; and after the support structure moves to the support position, the anti-detachment bosses prevent the support columns from being detached from the clamping grooves.

In some alternative embodiments, the locking structure is provided with a first handle hole and a second handle hole, and the support structure is provided with a third handle hole and a fourth handle hole; the first handle hole and the second handle hole are both elongated holes; the container locking device further includes a handle, and the handle includes a first handle segment and a second handle segment arranged symmetrically; the first handle segment passes through the first handle hole and the third handle hole, a first end of the first handle segment passes through the first handle hole and then extends in a bending manner, and a second end of the first handle segment passes through the third handle hole and then extends in a bending manner; and the second handle segment passes through the second handle hole and the fourth handle hole, a first end of the second handle hole passes through the second handle hole and then extends in a bending manner, and is connected to the first end of the first handle hole to enclose a grasping space, and a second end of the second handle segment passes through the fourth handle hole and then extends in a bending manner.

In some alternative embodiments, the container locking device further includes a blocking structure, the blocking structure is connected to the first side plate, and the blocking structure includes a snap-fit; and when the locking structure is located at the avoiding position, the snap-fit is snap-fitted with the second end of the locking structure, so that the locking structure stays at the avoiding position, and the support structure is located between the locking structure and the first side plate.

According to another aspect of some embodiments of the present disclosure, a piggyback transport vehicle is provided, the piggyback transport vehicle includes: a concave chassis, the concave chassis including multiple container locking devices, the container locking devices being the described container locking device; the concave chassis has a loading space for loading containers or wheeled vehicles; the multiple container locking devices are symmetrically arranged at two sides of the loading space, and multiple accommodating spaces of the multiple container locking devices are all in communication with the loading space; when the locking structure of the container locking device is located at the locking position, the second end of the locking structure extends out of the accommodating space and extends into the loading space, and the loading space is used for loading containers; and when the locking structure of the container locking device is located at the avoiding position, the second end of the locking structure is retracted into the accommodating space from the loading space, and the loading space is used for loading wheeled vehicles.

In the technical solutions of some embodiments of the present disclosure, an inward-overturning container locking device is provided. When the locking structure of the container locking device extends from the accommodating space to the locking position to lock a container, the support structure moves, along with the locking structure, to the support position and cooperates with the support of the container locking device, such that the locking structure stays at the locking position. Compared with a single cantilever structure, the container locking device is safer and more reliable, receives less force, and can support and lock containers more reliably and stably, facilitating improving the performance of the container locking device, and thus a piggyback transport vehicle using the inward-overturning container locking device is safer and more reliable in the process of transporting containers. Moreover, the inward-overturning container locking device does not need to occupy additional space, so that the piggyback transport vehicle is not limited to sites, and cargos can be loaded or unloaded on high platforms or within building boundary regions. When the piggyback transport vehicle needs to switch to transport wheeled vehicles, the locking structure moves from the locking position to the avoiding position, such that the locking structure is retracted into the accommodating space, and the support structure moves, along with the locking structure, to the retraction position, and the support structure is also retracted into accommodating space, and thus wheeled vehicles can be driven into or out of the concave chassis reliably and smoothly, and do not interfere with the container locking devices, so that the piggyback transport vehicle provided by some embodiments of the present disclosure not only can transport wheeled vehicles, but also can transport containers.

BRIEF DESCRIPTION OF THE DRAWINGS

The drawings of the description, constituting a part of some embodiments of the present disclosure, are used for providing further understanding of some embodiments of the present disclosure, and the illustrative embodiments of the present disclosure and illustrations thereof are used to explain some embodiments of the present disclosure, rather than constitute inappropriate limitation on some embodiments of the present disclosure. In the drawings.

Figure 1:
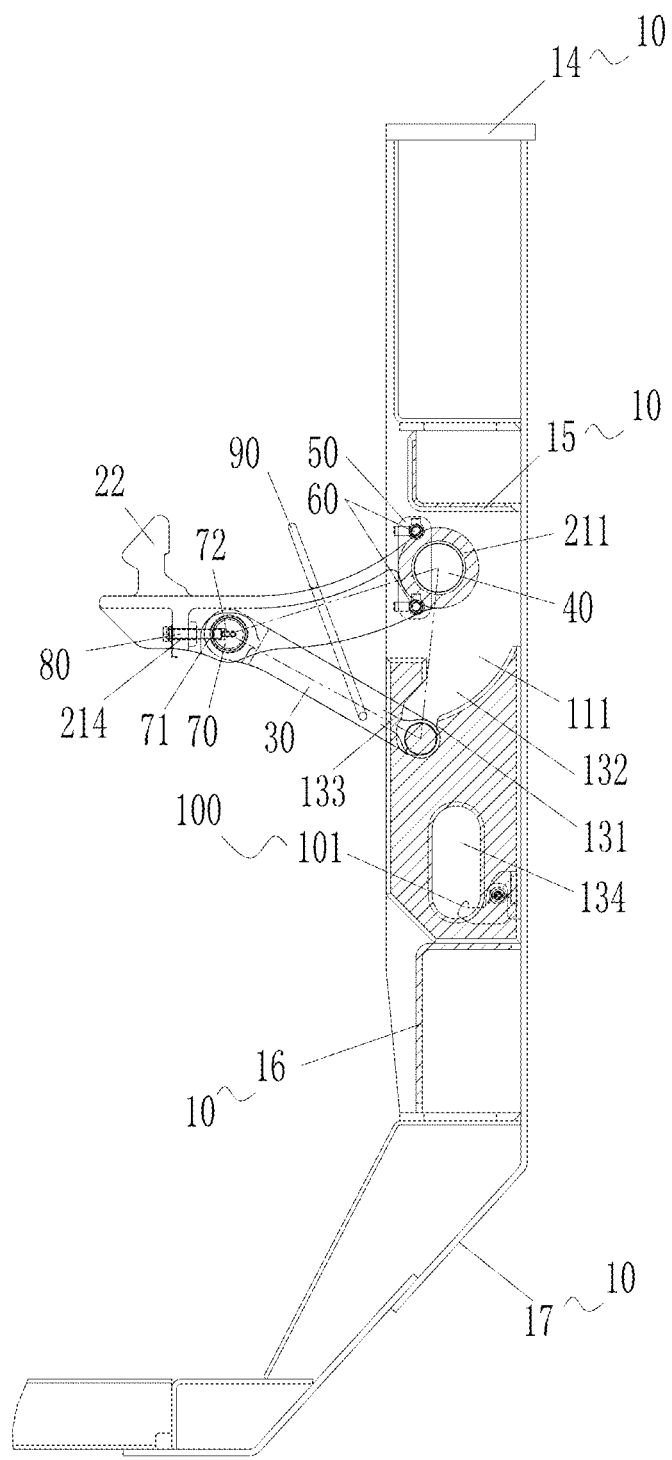
FIG. 1 shows a schematic diagram of the structure of a container locking device according to some alternative embodiments of the present disclosure, wherein a locking structure of the container locking device is located at a locking position.

The described figures include the following reference signs:

1: concave chassis; 3: loading space; 2: container locking device; 10: support; 111: accommodating space; 11: first side plate; 112: avoiding hole; 12: second side plate; 121: first assembly hole; 13: vertical plate; 131: clamping groove; 132: guide groove; 133: anti-detachment boss; 134: welding hole; 135: transition inclined surface; 14: upper cover plate; 15: connecting base; 16: support base; 17: lower side beam; 20: locking structure; 211: first mounting hole; 212: groove; 213: second assembly hole; 214: first connecting hole; 215: first handle hole; 216: second handle hole; 217: first weight-reduction groove; 22: locking head; 23: bottom transition face; 24: profile face; 241: profile face inflection point; 25: top transition face; 26: stiffening rib; 27: reinforcing rib; 30: support structure; 311: second mounting hole; 312: avoiding hole; 32: support column; 33: third handle hole; 34: fourth handle hole; 351: second weight-reduction groove; 352: third weight-reduction groove; 36: transition rib; 40: first rotary shaft; 41: limiting groove; 50: clamping plate; 60: first connecting member; 70: second rotary shaft; 71: second connecting hole; 72: rotation hole; 80: second connecting member; 90: handle; 91: first handle segment; 92: second handle segment; 93: grasping space; 100: blocking structure; 101: snap-fit.

DETAILED DESCRIPTION OF THE EMBODIMENTS

Hereinafter, the technical solutions in the embodiments of the present disclosure will be described clearly and completely with reference to the accompanying drawings of the embodiments of the present disclosure. Obviously, the embodiments as described are only some of the embodiments of the present disclosure, and are not all of the embodiments. The following description of at least one exemplary embodiment is merely illustrative in nature and is in no way intended to limit some embodiments of the present disclosure and any applications or uses thereof. All other embodiments obtained by a person of ordinary skill in the art on the basis of the embodiments of the present disclosure without any inventive effort shall all fall within the scope of protection of some embodiments of the present disclosure.

In order to solve the problem in the related art that the container locking device has an outward-overturning cantilever structure, thereby affecting the performance of the container locking device, some embodiments of the present disclosure provide a container locking device and a piggyback transport vehicle.

As shown in FIGS. 1-16, some embodiments of the present disclosure provide a container locking device, including a support 10, a locking structure 20 and a support structure 30, wherein the support 10 has an accommodating space 111; a first end of the locking structure 20 is hinged to the support 10, the locking structure 20 has a locking position extending out of the accommodating space 111 and an avoiding position retracted into the accommodating space 111, and a first end of the support structure 30 is hinged with a second end of the locking structure 20; wherein in a direction away from the locking structure 20, the support structure 30 has a retraction position and a support position which cooperates with the support 10. When the locking structure 20 is located at the locking position, the support structure 30 is located at the support position and the locking structure 20 is caused to stay at the locking position; and when the locking structure 20 is located at the avoiding position, the support structure 30 is located at the retraction position and is retracted into the accommodating space 111.

In the embodiments of the present disclosure, an inward-overturning container locking device is provided. When the locking structure 20 of the container locking device extends from the accommodating space to the locking position to lock a container, the support structure 30 moves, along with the locking structure 20, to the support position and cooperates with the support of the container locking device, such that the locking structure 20 stays at the locking position. Compared with a single cantilever structure, the container locking device is safer and more reliable, receives less force, and can support and lock containers more reliably and stably, facilitating improving the performance of the container locking device, and thus a piggyback transport vehicle using the inward-overturning container locking device is safer and more reliable in the process of transporting containers. When the container locking device is not needed, the locking structure 20 moves from the locking position to the avoiding position, the locking structure 20 is retracted into the accommodating space 111, the support structure moves to the retraction position along with the locking structure 20, and the support structure 30 is also retracted into the accommodating space 111, thereby preventing the locking structure 20 and the support structure 30 from interfering with other structures, and reducing the space occupied by the container locking device.

As shown in FIG. 1, the support 10 is provided with a clamping groove 131 in communication with the accommodating space 111, and the clamping groove 131 is located below the first end of the support structure 30. When the support structure 30 is located at the support position, a second end of the support structure 30 is snap-fitted with the clamping groove 131, and the first end of the locking structure 20, the first end of the support structure 30 and the second end of the support structure 30 form a triangle. When no external force is applied to the locking structure 20 and the support structure 30, the locking structure 20 and the support structure 30 form a reliable and stable triangular structure, and the locking structure 20 can reliably and stably support the container. When an external force is applied to the locking structure 20 and the support structure 30, the second end of the support structure 30 is detached from the clamping groove 131, such that the locking structure 20 rotates to the avoiding position, and the support structure 30 moves to the retraction position.

As shown in FIG. 1, the support 10 further has a guide groove 132 in communication with the clamping groove 131, and the guide groove 132 extend along the movement trajectory of the second end of the support structure 30. In this way, during the movement of the support structure 30 between the support position and the retraction position, the guide groove 132 guide the support structure 30, making the movement of the support structure 30 more stable, and ensuring that the support structure 30 can move into the clamping grooves 131 smoothly.

Figure 2:
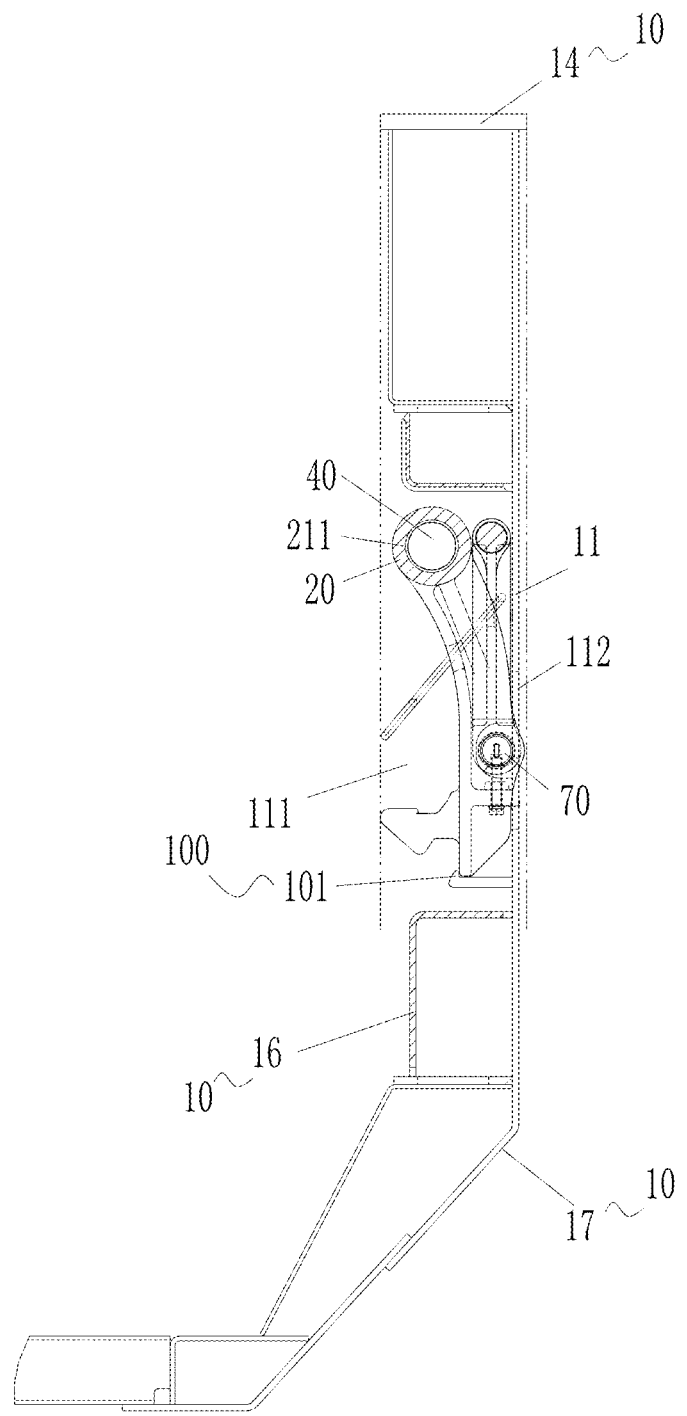
FIG. 2 shows a schematic diagram of the structure of the container locking device in FIG. 1 in another state, wherein the locking structure of the container locking device is located at an avoiding position.
Figure 5:
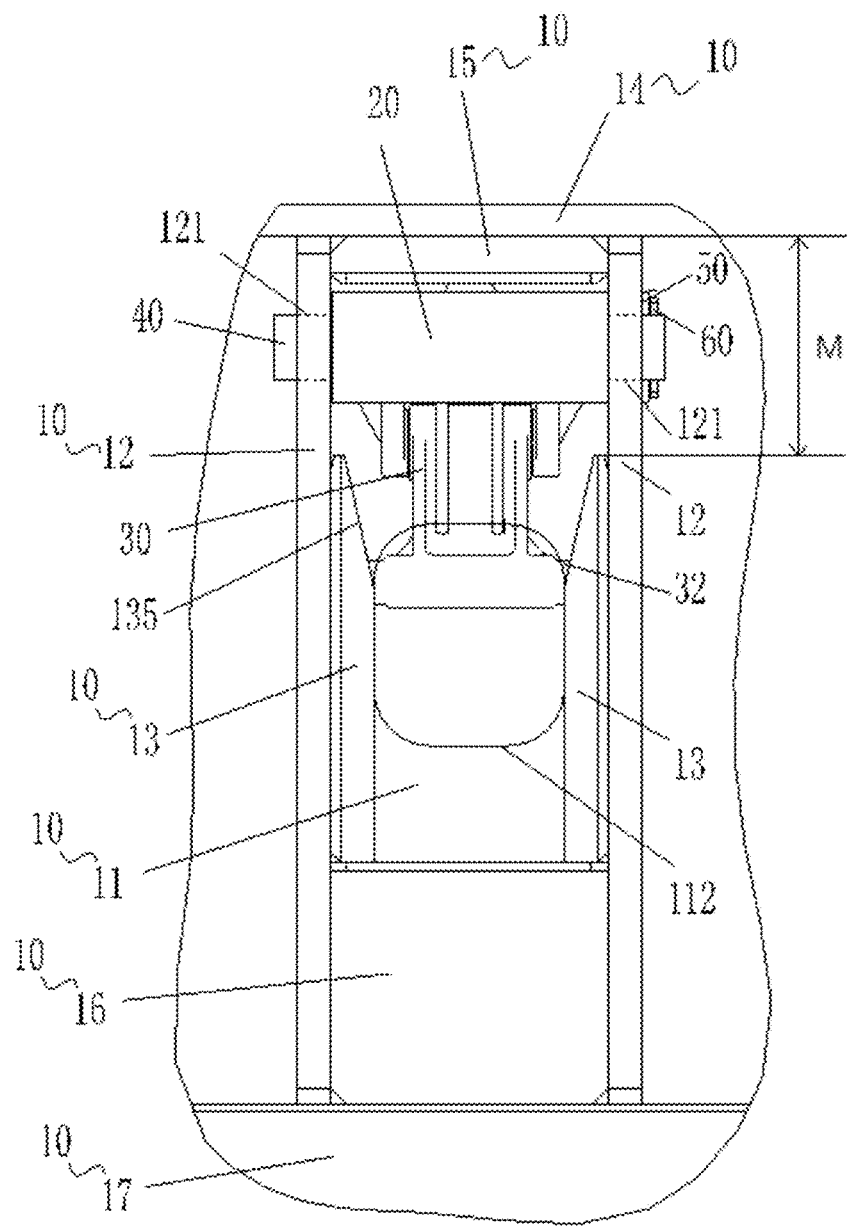
FIG. 5 shows a schematic diagram of some structures of the container locking device of FIG. 1 from another angle.
Figure 6:
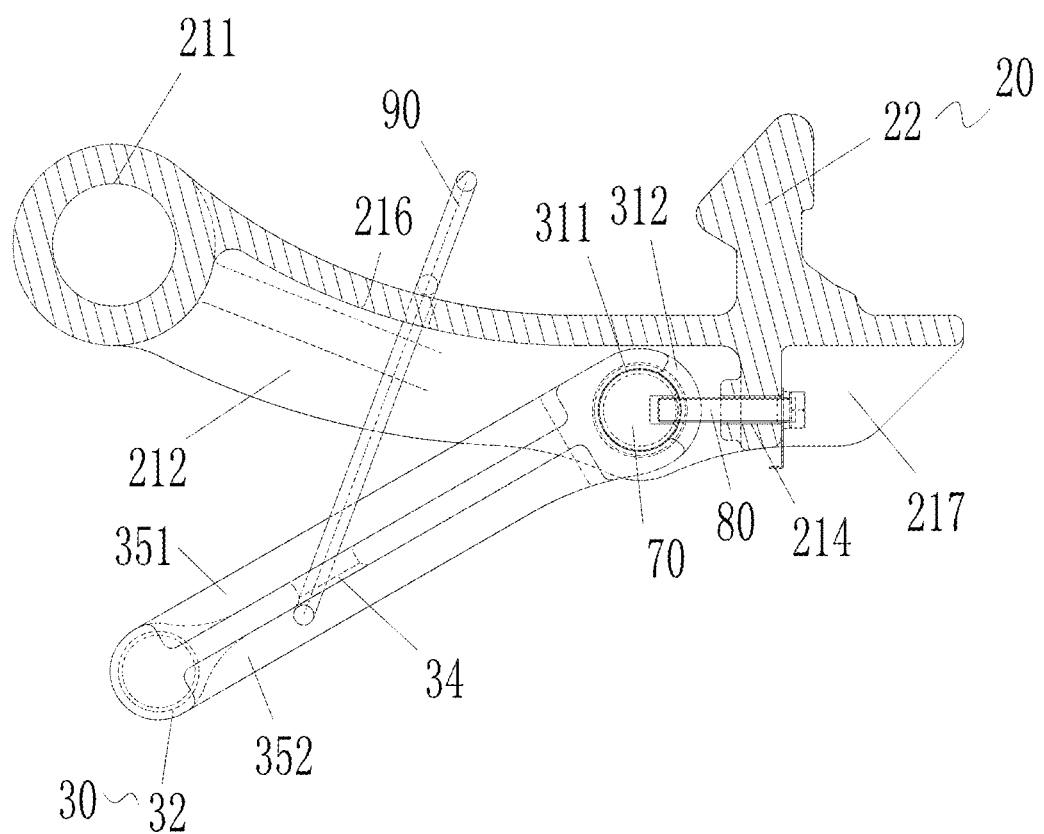
FIG. 6 shows a schematic diagram of an assembled structure of some structures of the container locking device of FIG. 1.

As shown in FIG. 5, the support 10 includes a first side plate 11 and two second side plates 12. The two second side plates 12 are provided on the first side plate 11 at an interval in a first direction, and the first side plate 11 and the two second side plates 12 enclose the accommodating space 111. As shown in FIGS. 1, 2 and 5, the container locking device further includes a first rotary shaft 40, two ends of the first rotary shaft 40 are respectively connected to the two second side plates 12. The first end of the locking structure 20 is provided with a first mounting hole 211, and the locking structure 20 is pivotally sleeved on the first rotary shaft 40 through the first mounting hole 211. A locking head 22 cooperating with the container is provided on the surface, away from the first side plate 11, of the second end of the locking structure 20. The locking structure 20 rotates to the locking position or the avoiding position relative to the first rotary shaft 40. When the locking structure 20 rotates to the locking position, the locking head 22 extends out of the accommodating space 111 to support and lock the container; and when the locking structure 20 rotates to the avoiding position, the locking head 22 retracts into the accommodating space 111.

Figure 14:
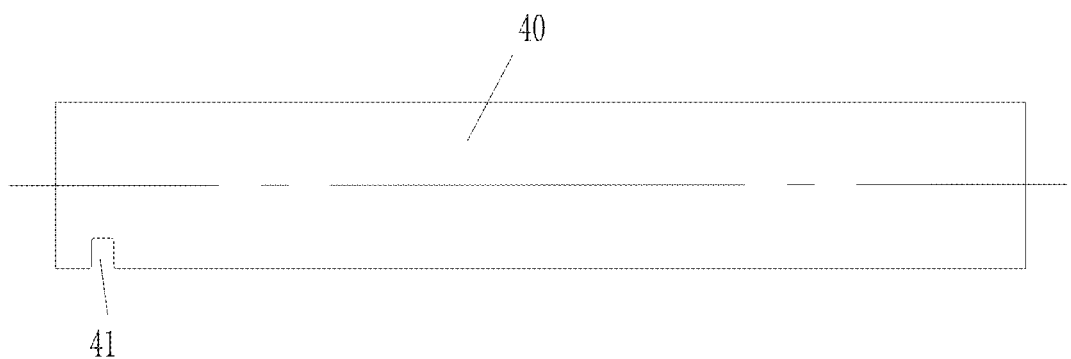
FIG. 14 shows a schematic diagram of the structure of a first rotary shaft of the container locking device of FIG. 1.

As shown in FIG. 5, each of the two second side plates 12 is provided with a first assembly hole 121, and two ends of the first rotary shaft 40 respectively penetrate through the two first assembly holes 121. As shown in FIG. 14, a limiting groove 41 extending in the radial direction of the first rotary shaft 40 is provided on the outer circumferential surface of the first rotary shaft. As shown in FIG. 5, the container locking device further includes a clamping plate 50 fitting the limiting groove 41, at least a part of the clamping plate 50 extends into the limiting groove 41, and the clamping plate 50 is connected with one of the two second side plates 12 by a first connecting member 60, so that the first rotary shaft 40 is fixedly connected with the support 10. In this way, the clamping plate 50 fits the limiting groove 41, to prevent the first rotary shaft 40 from axially or radially moving relative to the support 10. In addition, the first rotary shaft 40 is detachably provided on the support 10 by the clamping plate 50 and the first connecting member 60, so as to facilitate assembly, disassembly and subsequent maintenance of the first rotary shaft 40 and the locking structure 20.

Alternatively, the first assembly hole 121 is a threaded hole, and the first connecting member 60 includes a bolt and an anti-detachment gasket.

In alternative embodiments not shown in figures of the present disclosure, two ends of the first rotary shaft 40 may be welded with the two second side plates 12.

Figure 9:
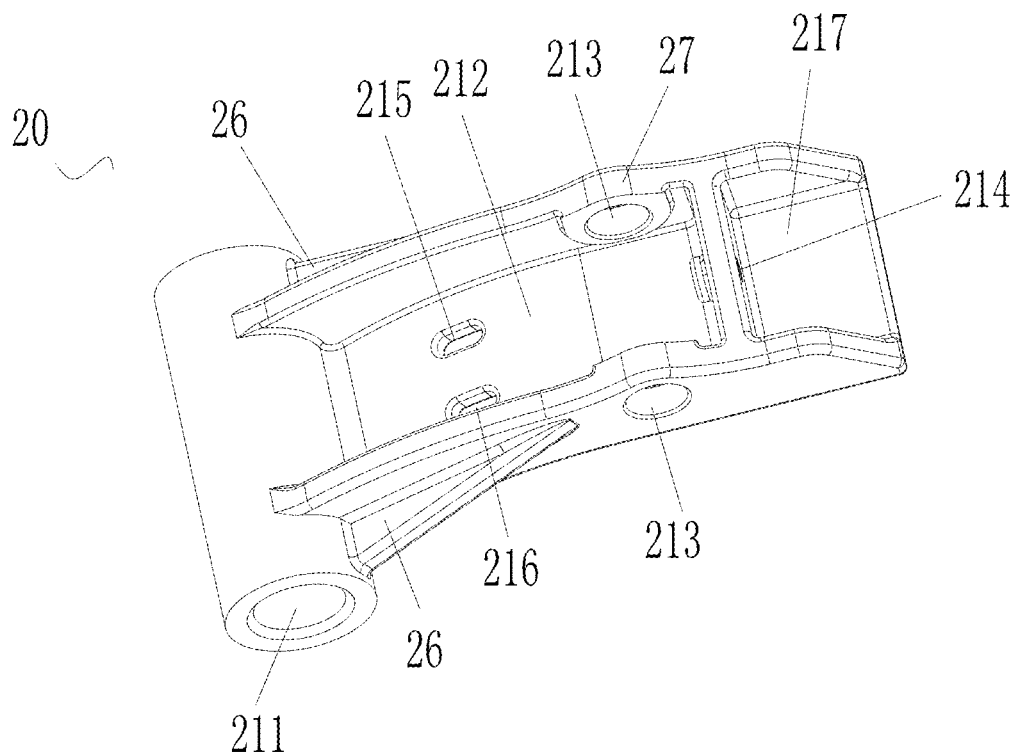
FIG. 9 shows a schematic diagram of a perspective structure of the locking structure of FIG. 8 from another angle.
Figure 10:
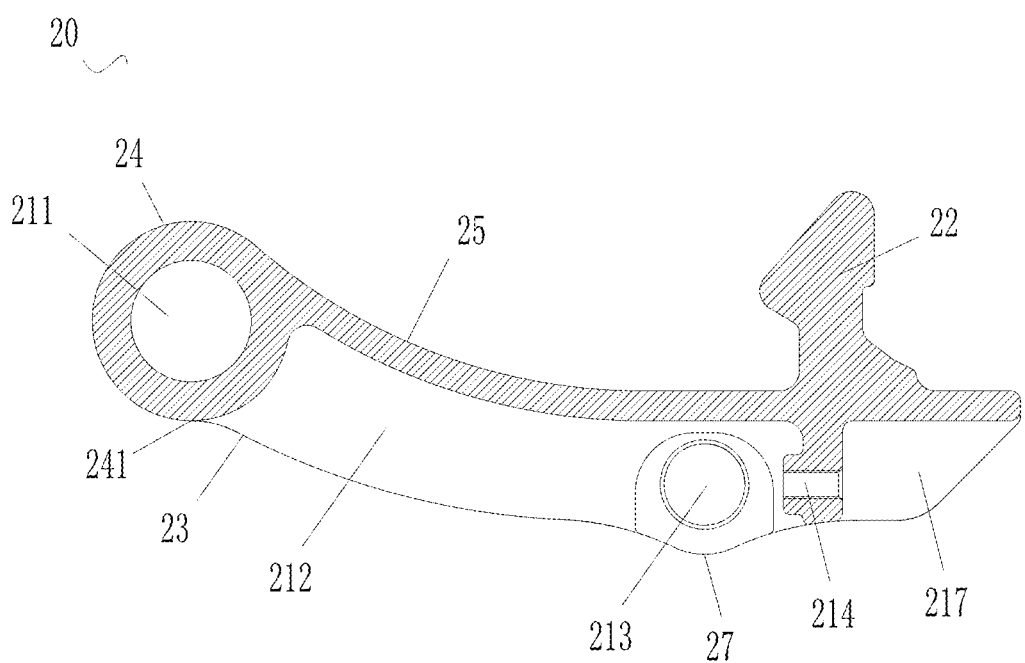
FIG. 10 shows a schematic diagram of a cutaway structure of the locking structure of FIG. 8.
Figure 11:
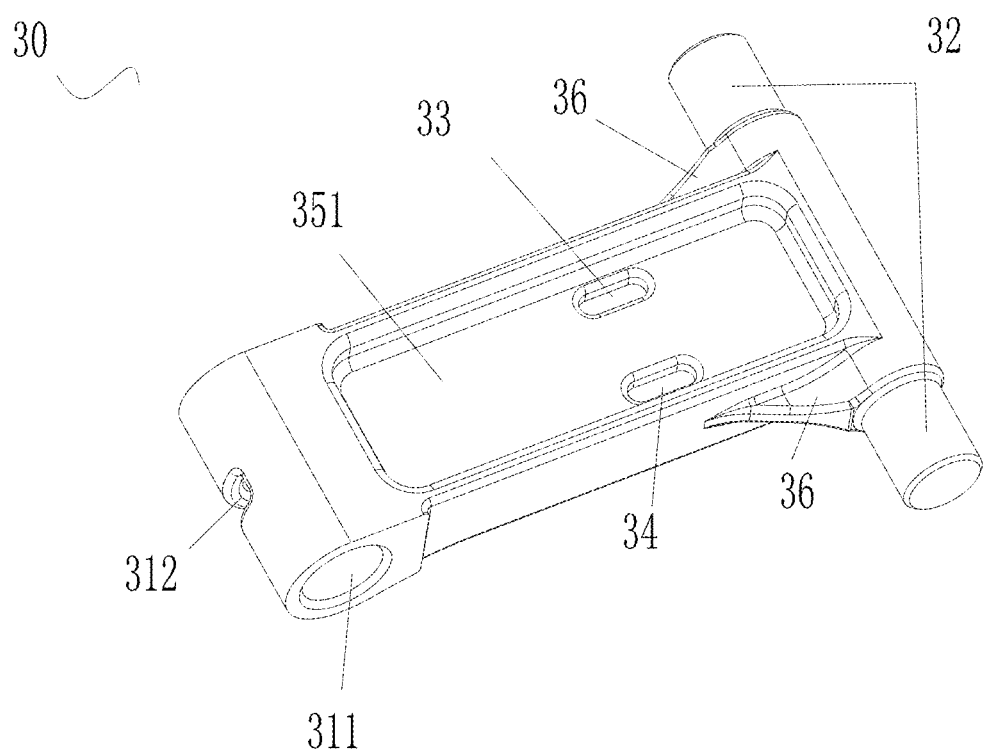
FIG. 11 shows a schematic diagram of a perspective structure of a support structure of the container locking device of FIG. 1 from one angle.
Figure 12:
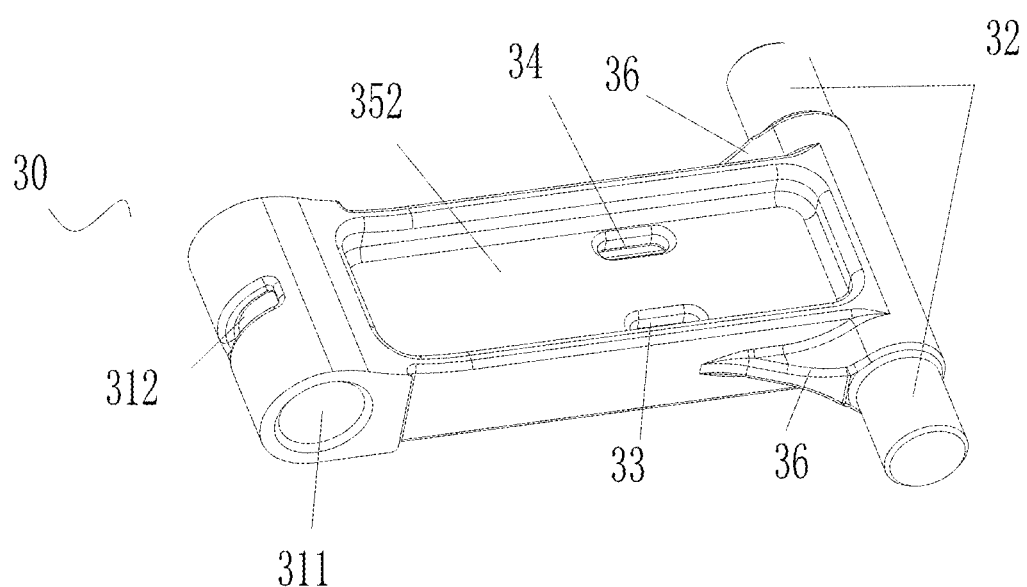
FIG. 12 shows a schematic diagram of a perspective structure of the support structure of FIG. 11 from another angle.
Figure 13:
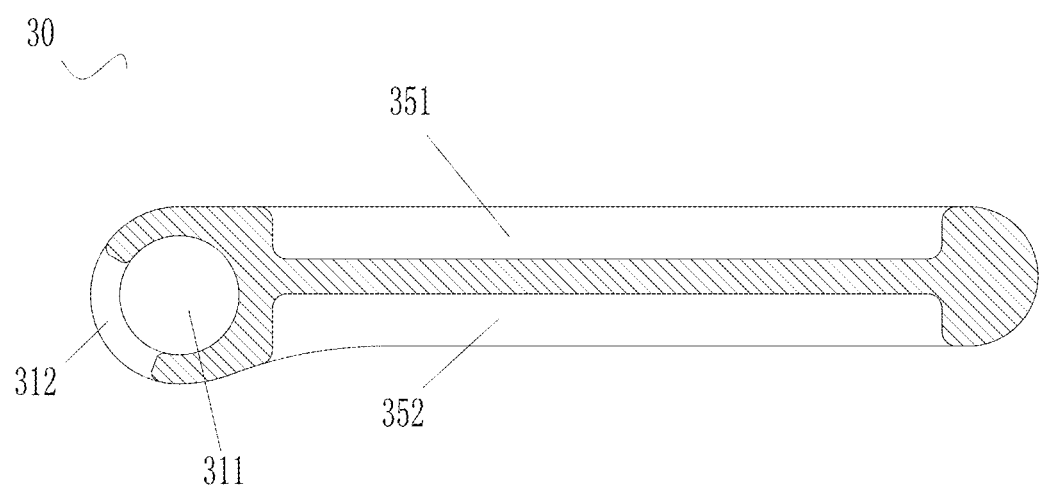
FIG. 13 shows a schematic diagram of a cutaway structure of the support structure of FIG. 11.

As shown in FIGS. 9 and 10, a groove 212 is provided on the surface, close to the first side plate 11, of the locking structure 20, and the groove 212 is used for accommodating the support structure 30. One second assembly hole 213 is provided on each of two second groove side walls, provided in the first direction, of the groove 212. A first connecting hole 214 is provided on a first groove side wall, away from the first mounting hole 211, of the groove 212. As shown in FIGS. 1, 2, 6, 7 and 15, the locking device further includes a second rotary shaft 70 and a second connecting member 80, two ends of the second rotary shaft 70 respectively penetrate through the two second assembly holes 213, and a second connecting hole 71 provided opposite to the first connecting hole 214 is provided on an outer circumferential wall of the second rotary shaft 70. The second connecting member 80 penetrates through the first connecting hole 214 and the second connecting hole 71, so that the second rotary shaft 70 is fixedly connected with the locking structure 20. As shown in FIGS. 11-13, the first end of the support structure 30 is provided with a second mounting hole 311, and the support structure 30 is pivotably sleeved on the second rotary shaft 70 through the second mounting hole 311. An avoiding hole 312 for avoiding the second connecting member 80 is provided on a hole wall of the second mounting hole 311. In this way, the second rotary shaft 70 is fixed on the locking structure 20 by the second connecting member 80, and the support structure 30 rotates to the support position or the retraction position relative to the second rotary shaft 70. The support structure 30 and the locking structure 20 are detachably connected, facilitating the assembly, disassembly and subsequent maintenance of the second rotary shaft 70 and the support structure 30. The groove 212 provides an accommodating space for the support structure 30 while ensuring the bearing strength of the locking structure 20, facilitating the miniaturized design of the container locking device.

As shown in FIGS. 6, 7 and 11-13, the avoiding hole 312 is of fan-shaped. The dimension of the fan-shaped avoiding hole 312 is set according to the rotation angle of the support structure 30, so as to ensure that the support structure 30 can reliably move to the support position or the retraction position.

Figure 7:
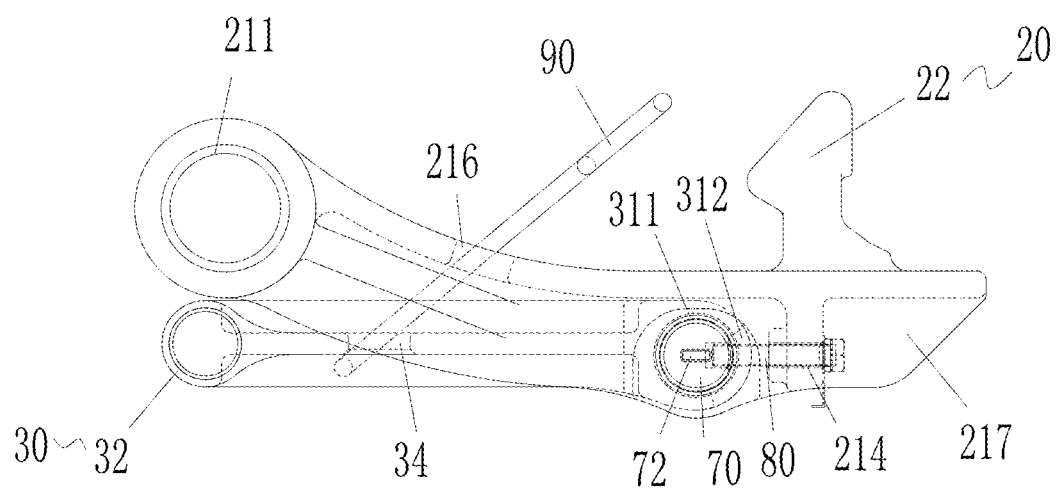
FIG. 7 shows a schematic diagram of an assembled structure of some structures of the container locking device of FIG. 2.

As shown in FIGS. 6, 7, 9 and 10, the second end of the locking structure 20 is further provided with a first weight-reduction groove 217 provided at an interval from the groove 212, and the first connecting hole 214 communicates the first weight-reduction groove 217 with the groove 212. As shown in FIG. 7, the first weight-reduction groove 217 also provides a mounting space for the second connecting member 80 while achieving the function of reducing weight, thereby preventing the second connecting member 80 from interfering with other structures.

Figure 8:
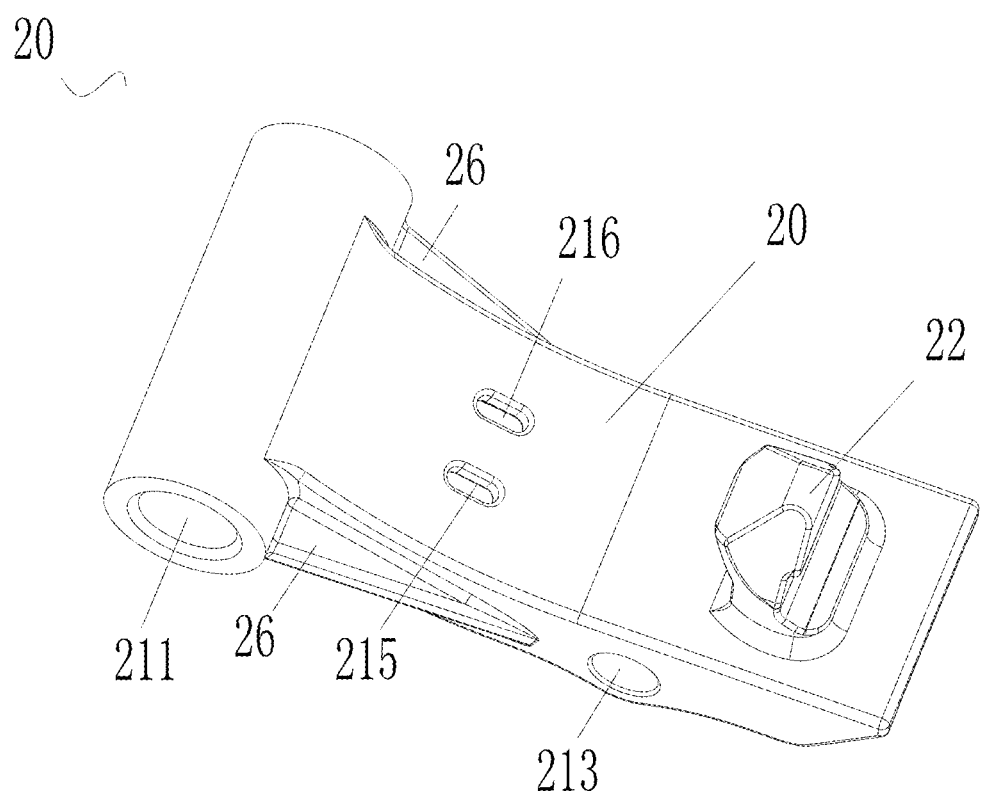
FIG. 8 shows a schematic diagram of a perspective structure of the locking structure of the container locking device of FIG. 1 from one angle.

As shown in FIGS. 8-10, the locking structure 20 has a bottom transition face 23, a profile face 24, a profile face inflection point 241, a top transition face 25, a stiffening rib 26, and a reinforcing rib 27. The locking head 22 is provided on the top transition face 25, and the bottom transition face 23 starts from the profile face inflection point 241 of the profile face 24, so that when the support structure 30 is located at the retraction position, a part of the outer circumferential surface of the support column 32 is able to abut against the profile face 24, thereby ensuring that the support structure 30 has enough space when in the retraction position. The reinforcing rib 27 is composed of three segments of circular arcs, which can achieve the effect of increasing the diameter of the second assembly hole 213 on the basis of reducing the space occupied by the support structure 30 as much as possible, thereby facilitating increasing the diameter of the second rotary shaft 70 and improving the strength of the second rotary shaft 70. The bottom transition face 23 is composed of four segments of circular arcs by transitioning from the profile face inflection point 241 to the reinforcing rib 27, so as to ensure that the received force is gentle and uniform. One end of the reinforcing rib 26 is connected with the profile face 24, and the other end of the reinforcing rib 26 extends towards the second end of the locking structure 20, facilitating improving the strength of the locking structure 20, thereby improving the torsion resistance, under the longitudinal forces, of the container locking device when loading containers. The top transition face 25 is of arc-shaped, so as to ensure that the received force is gentle and uniform. The locking head 22 provides transverse and longitudinal fixing effects when loading different containers, so as to play an anti-detachment role during transportation of containers. When slight relative rotation occurs between the container and the locking head 22, the container and the locking head 22 can be detached.

As shown in FIGS. 11-13, the support structure 30 is provided with a second weight-reduction groove 351 and a third weight-reduction groove 352, thereby reducing the weight of the support structure 30, facilitating operation.

As shown in FIGS. 11 and 12, a transition rib 36 is further provided on the support structure 30, one end of the transition rib 36 is connected to the support column 32, and the other end of the transition rib 36 extends towards the first end of the support structure 30, facilitating improving the strength of the support structure 30.

Alternatively, two sides of the first end of the support structure 30 are machining faces for contacting the inner wall faces of the groove 212 of the locking structure 20, increasing the contact area between the support structure 30 and the locking structure 20, and increasing the force-receiving region. The middle portion of the support structure 30 is a non-machining region and can be directly formed during casting, and the middle portion does not belong to a force-receiving face cooperating region, and thus providing the middle portion as a non-machining region can reduce the manufacturing costs.

Alternatively, the first connecting hole 214 is a threaded hole, and the second connecting member 80 includes a bolt, a gasket, and an anti-detachment gasket.

Figure 15:
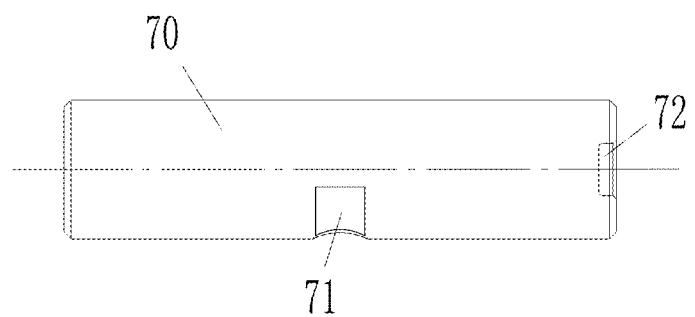
FIG. 15 shows a schematic diagram of the structure of a second rotary shaft of the container locking device of FIG. 1.

As shown in FIGS. 7 and 15, a rotation hole 72 is provided on an axial end face of the second rotary shaft 70, and the hole wall face of the rotation hole 72 includes a transmission plane to drive, through the rotation hole 72, the second rotary shaft 70 to rotate, so that the second connecting hole 71 is provided opposite to the first connecting hole 214. In this way, when assembling the second rotary shaft 70 and the support structure 30, a tool is used to extend into the rotation hole 72 to adjust the assembling position of the second rotary shaft 70, thereby facilitating increasing the assembling efficiency of the second rotary shaft 70 and the support structure 30.

As shown in FIGS. 1 and 5, the support 10 further includes vertical plates 13; a vertical plate 13 is provided on each of surfaces, opposite to each other, of the two second side plates 12, and each vertical plate 13 is provided with a clamping groove 131 and a guide groove 132. Two support columns 32 are provided at the second end of the support structure 30, and the two support columns 32 respectively cooperate with the two guide grooves 132; or the two support columns 32 respectively cooperate with the two clamping grooves 131. In this way, in the process of the support structure 30 moving from the retraction position to the support position, the support columns 32 first extend into the guide grooves 132, and move into the clamping grooves 131 under the guidance of the guide grooves 132 and are snap-fitted with the clamping grooves 131, so that the support structure 30 stays at the support position, and the locking structure 20 stays at the locking position. Correspondingly, under the action of an external force, the support columns 32 are caused to be detached from the clamping grooves 131 and move to the retraction position under the guidance of the guide grooves 132, and simultaneously, the locking structure 20 rotates to the avoiding position.

As shown in FIGS. 1, 2 and 5, the support 10 further includes an upper cover plate 14, the upper cover plate 14 being connected with the top ends of the two second side plates 12 and the top end of the first side plate 11. A distance M between the top ends of the vertical plates 13 and the upper cover plate 14. The first side plate 11 is provided with an avoiding hole 112 for avoiding the locking structure 20; or the first side plate 11 is provided with an avoiding hole 112 for avoiding the support structure 30; or the first side plate 11 is provided with an avoiding hole 112 for avoiding the locking structure 20 and the support structure 30. When the locking structure 20 is located at the avoiding position and the support structure 30 is located at the retraction position, a mounting space is formed between the planes where two side faces of the upper cover plate 14 are located, and the locking structure 20 and the support structure 30 are located within the mounting space. In this way, when the container locking device is not needed, it is ensured that the locking structure 20 and the support structure 30 do not protrude from two side faces of the upper cover plate 14, thereby effectively preventing the locking structure 20 and the support structure 30 from interfering with other structures. The provision of the avoiding hole 112 on the first side plate 11 facilitates further space saving, that is, when the locking structure 20 is located at the avoiding position and the support structure 30 is located at the retraction position, some structures of the locking structure 20 and/or the support structure 30 can be accommodated within the avoiding hole 112.

In addition, as the locking structure 20 and the support structure 30 are of an inward-overturning type, the upper cover plate 14 and the first side plate 11 do not need to be provided with a notch for outward overturning of the container locking device, that is, the upper cover plate 14 and the first side plate 11 do not need to be arranged in segments, thereby facilitating improving the rigidity of the upper cover plate 14 and the first side plate 11, and improving the force-receiving condition of the container locking device. Correspondingly, the force-receiving condition of the piggyback transport vehicle can be improved, the overall rigidity of the piggyback transport vehicle can be improved, and the safety and stability of the piggyback transport vehicle when transporting containers or wheeled vehicles can be ensured.

Alternatively, as shown in FIG. 5, each vertical plate 13 includes a transition inclined surface 135 arranged close to the upper cover plate 14, and the top end of each vertical plate 13 and the upper cover plate 14 are provided at an interval, so that the support structure 30 is accommodated in the accommodating space 111 when the support structure is located at the retraction position, thereby facilitating the miniaturized design of the container locking device.

As shown in FIG. 1, the groove bottom walls of the guide grooves 132 are of arc-shaped, and with respect to the clamping grooves 131, the guide grooves 132 are provided closer to the first side plate 11. In this way, the support columns 32 are guided by the groove bottom walls of the guide grooves 132, and in order to facilitate the entrance of the support columns 32 into the guide grooves 132, the notches, on the upper surfaces of the vertical plates 13, of the guide grooves 132 are greater than the dimension of the support columns 32.

As shown in FIG. 1, each vertical plate 13 includes an anti-detachment boss 133, the anti-detachment boss 133 being located at a groove opening of the clamping groove 131 and located at the side away from the first side plate 11. After the support structure 30 moves to the support position, the anti-detachment bosses 133 prevent the support columns 32 from being detached from the clamping grooves 131. In the process of lifting the containers, the anti-detachment bosses 133 can prevent the locking structure 20 from continuing overturning, and prevent the support columns 32 of the support structure 30 from being detached from the clamping grooves 131.

As shown in FIG. 1, the vertical plates 13 are further provided with welding holes 134, the vertical plates 13 are welded with the second side plates 12, and welding beads extend along the circumferential direction of the welding holes 134.

As shown in FIGS. 1, 2 and 5, the support 10 further includes a connecting base 15, a support base 16 and a lower side beam 17. The first side plate 11, the second side plates 12, the vertical plates 13, the upper cover plate 14, the connecting base 15, the support base 16 and the lower side beam 17 are assembled and welded to form an integral frame structure.

Figure 16:
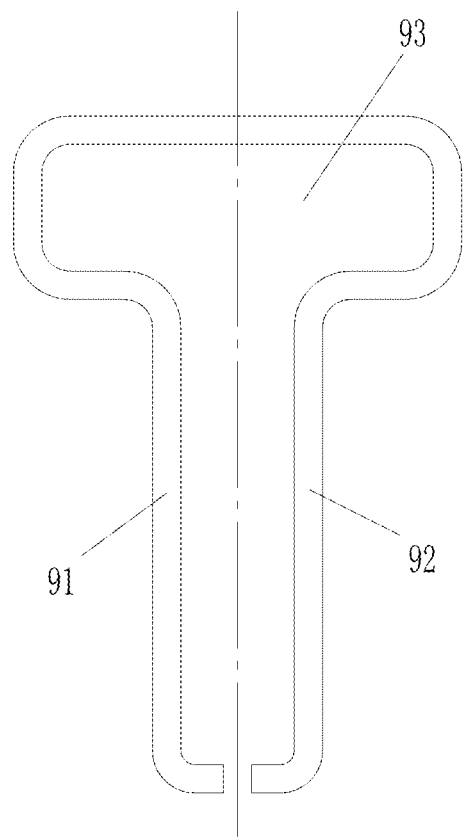
FIG. 16 shows a schematic diagram of the structure of a handle of the container locking device of FIG. 1.
Figure 17:
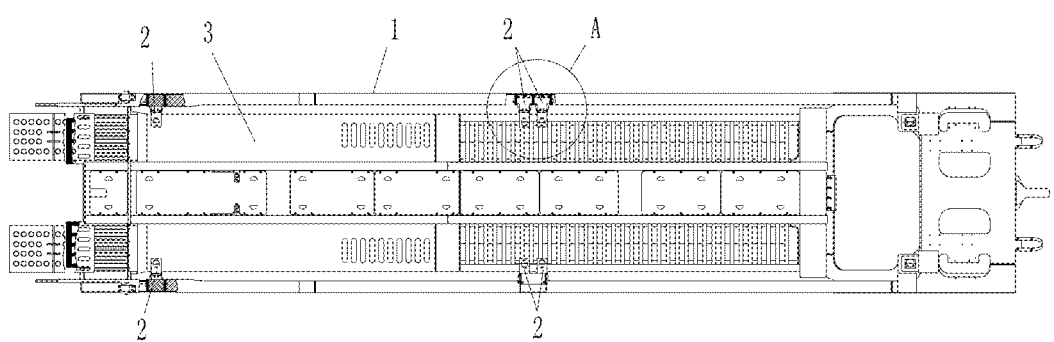
FIG. 17 shows a schematic diagram of the structure of a piggyback transport vehicle according to some alternative embodiments of the present disclosure.
Figure 18:
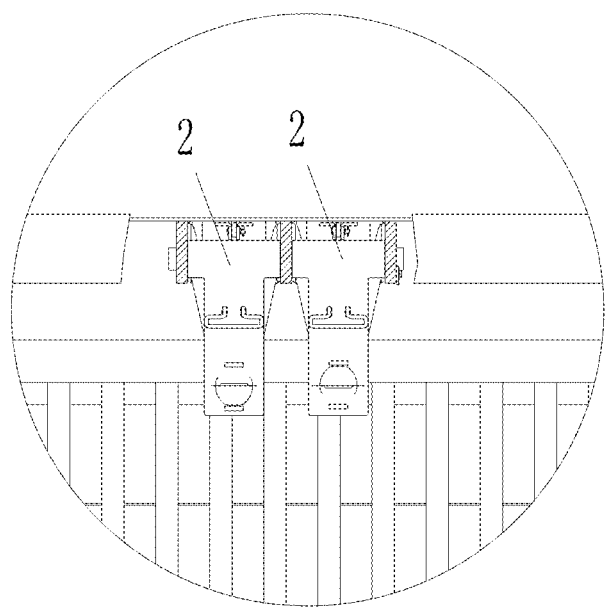
FIG. 18 shows an enlarged schematic diagram of the structure of position A in FIG. 17, wherein two locking structures of two container locking devices are both in the locking position.
Figure 19:
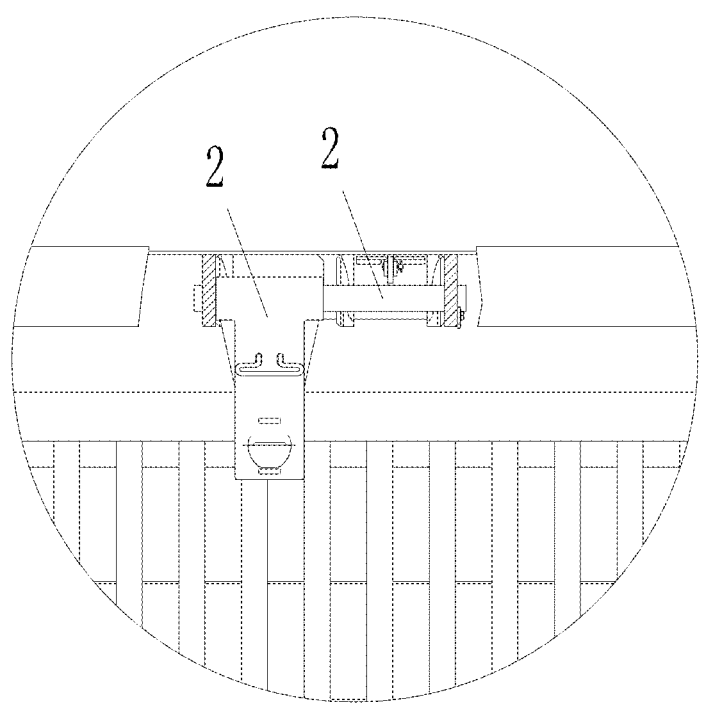
FIG. 19 shows an enlarged schematic diagram of the structure of position A in FIG. 17, wherein a locking structure of one container locking device is located at the locking position, and a locking structure of another container locking device is located at the avoiding position.
Figure 20:
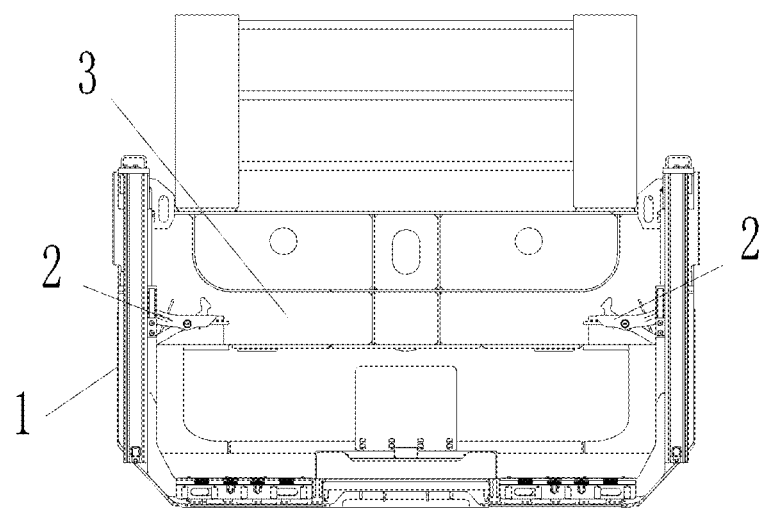
FIG. 20 shows a schematic diagram of the structure of the piggyback transport vehicle of FIG. 17 from another angle.

As shown in FIGS. 8 and 9, the locking structure 20 is provided with a first handle hole 215 and a second handle hole 216. As shown in FIGS. 11 and 12, the support structure 30 is provided with a third handle hole 33 and a fourth handle hole 34. The first handle hole 215 and the second handle hole 216 are both elongated holes. As shown in FIG. 16, the container locking device further includes a handle 90, and the handle 90 includes a first handle segment 91 and a second handle segment 92 arranged symmetrically. As shown in FIGS. 1, 2, 6 and 7, the first handle segment 91 passes through the first handle hole 215 and the third handle hole 33, a first end of the first handle segment 91 passes through the first handle hole 215 and then extends in a bending manner, and a second end of the first handle segment 91 passes through the third handle hole 33 and then extends in a bending manner. The second handle segment 92 passes through the second handle hole 216 and the fourth handle hole 34, a first end of the second handle segment 92 passes through the second handle hole 216 and then extends in a bending manner, and is connected to the first end of the first handle segment 91 to enclose a grasping space 93, and a second end of the second handle segment 92 passes through the fourth handle hole 34 and then extends in a bending manner. Thus, through the handle 90, an operator can drive the locking structure 20 to rotate between the locking position and the avoiding position, and drive the support structure 30 to move between the support position and the retraction position. The symmetrically-arranged handle 90 ensures that the handle 90 does not rotate.

In particular, when it is necessary to use the container locking device, the operator pulls the handle 90 outward through the grasping space 93, the locking structure 20 rotates upward, and the support structure 30 falls along the trajectory of the guide grooves 132 of the vertical plates 13 into the clamping grooves 131 of the vertical plates 13, the locking structure 20 rotates to the locking position, and the support structure 30 provides a vertical action force to the locking structure 20, such that the locking structure 20 reliably supports and locks the container. At this time, the state of the container locking device is as shown in FIG. 1. When it is no longer necessary to use the container locking device, the operator lifts the handle 90 upwards through the grasping space 93, and the locking structure 20 is driven to rotate downwards, so that the support columns 32 of the support structure 30 are detached from the clamping grooves 131 and move along the trajectory of the guide grooves 132 of the vertical plates 13 to the retraction position. At this time, the state of the container locking device is as shown in FIG. 2.

Alternatively, as shown in FIG. 16, the first handle segment 91 and the second handle segment 92 are of an integrated structure. The handle 90 is of T-shaped.

As shown in FIGS. 1 and 2, the container locking device further includes a blocking structure 100, the blocking structure 100 is connected with the first side plate 11, and the blocking structure 100 includes a snap-fit 101. When the locking structure 20 is located at the avoiding position, the snap-fit 101 is snap-fitted with the second end of the locking structure 20, so that the locking structure 20 stays at the avoiding position, and the support structure 30 is located between the locking structure 20 and the first side plate 11. In this way, after the locking structure 20 moves to the avoiding position and the support structure 30 moves to the retraction position, the locking structure 20 is limited by the snap-fit 101, so that the locking structure 20 is reliably stayed at the avoiding position and the support structure 30 is reliably stayed at the retraction position.

The container locking device provided in some embodiments of the present disclosure locks containers by using a closed stable triangular structure, and has the advantages of uniform force receiving, small force received by components and parts, simple and reliable structure, large locking force, strong damage resistance, simple operation, and good promotion value.

As shown in FIGS. 17-20, some embodiments of the present disclosure further provide a piggyback transport vehicle. The piggyback transport vehicle includes: a concave chassis 1, the concave chassis 1 including multiple container locking devices 2; the container locking devices 2 are the above described container locking devices. The concave chassis 1 has a loading space 3 for loading containers or wheeled vehicles. The multiple container locking devices 2 are symmetrically arranged at two sides of the loading space 3, and multiple accommodating spaces 111 of the multiple container locking devices 2 are all in communication with the loading space 3. When the locking structure 20 of the container locking device 2 is located at the locking position, the second end of the locking structure 20 extends out of the accommodating space 111 and extends into the loading space 3, and the loading space 3 is used for loading containers. When the locking structure 20 of the container locking device 2 is located at the avoiding position, the second end of the locking structure 20 is retracted into the accommodating space 111 from the loading space 3, and the loading space 3 is used for loading wheeled vehicles.

The piggyback transport vehicle provided in some embodiments of the present disclosure uses the inward-overturning container locking device provided in some embodiments of the present disclosure, and the container locking device does not need to occupy additional space during use, so that the piggyback transport vehicle is not limited to sites, and cargos can be loaded or unloaded on high platforms or within building boundary regions. When the piggyback transport vehicle needs to switch to transport wheeled vehicles, the locking structure 20 moves from the locking position to the avoiding position, such that the locking structure 20 is retracted into the accommodating space 111, and the support structure moves, along with the locking structure 20, to the retraction position, and the support structure 30 is also retracted into accommodating space 111, and thus wheeled vehicles can be driven into or out of the concave chassis 1 reliably and smoothly, and do not interfere with the container locking devices, so that the piggyback transport vehicle provided by some embodiments of the present disclosure not only can transport wheeled vehicles, but also can transport containers.

Compared with a single cantilever structure, the inward-overturning container locking device provided in some embodiments of the present disclosure is safer and more reliable and receives less force, so that the piggyback transport vehicle provided in some embodiments of the present disclosure is safer and more reliable during transportation.

Alternatively, the container locking device provided in some embodiments of the present disclosure is applicable to 20 ft containers and 40 ft containers.

Figure 3:
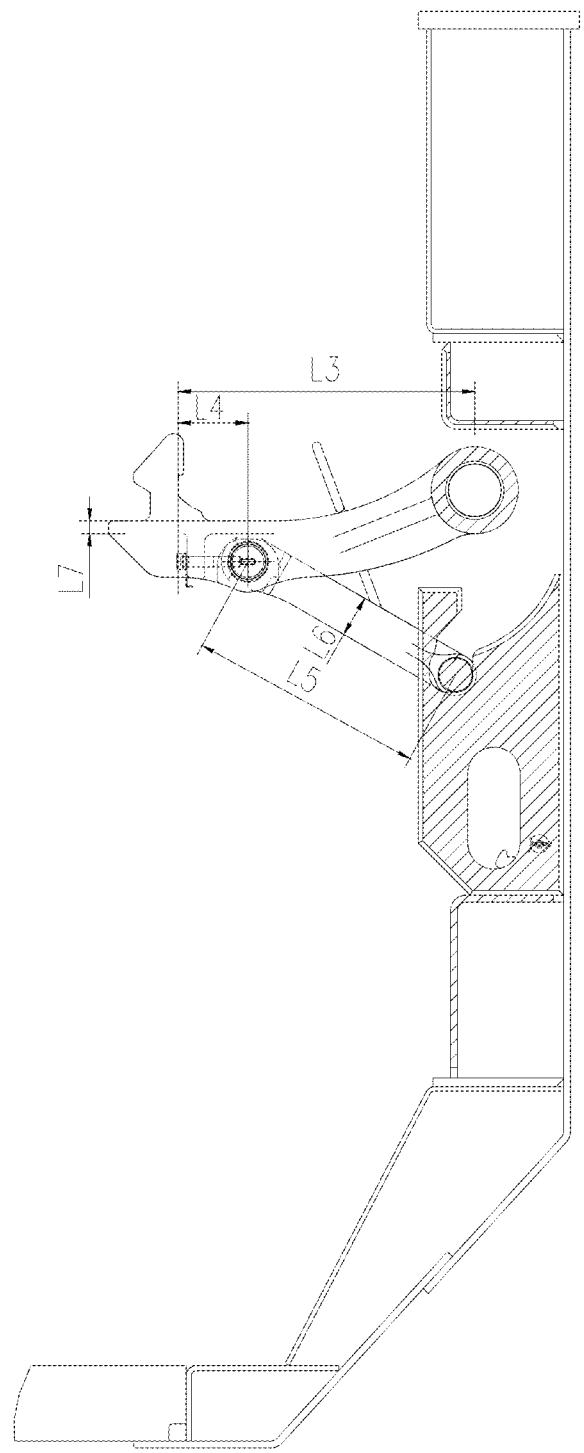
FIG. 3 shows a schematic diagram of the dimensional relationship of the container locking device of FIG. 1.
Figure 4:
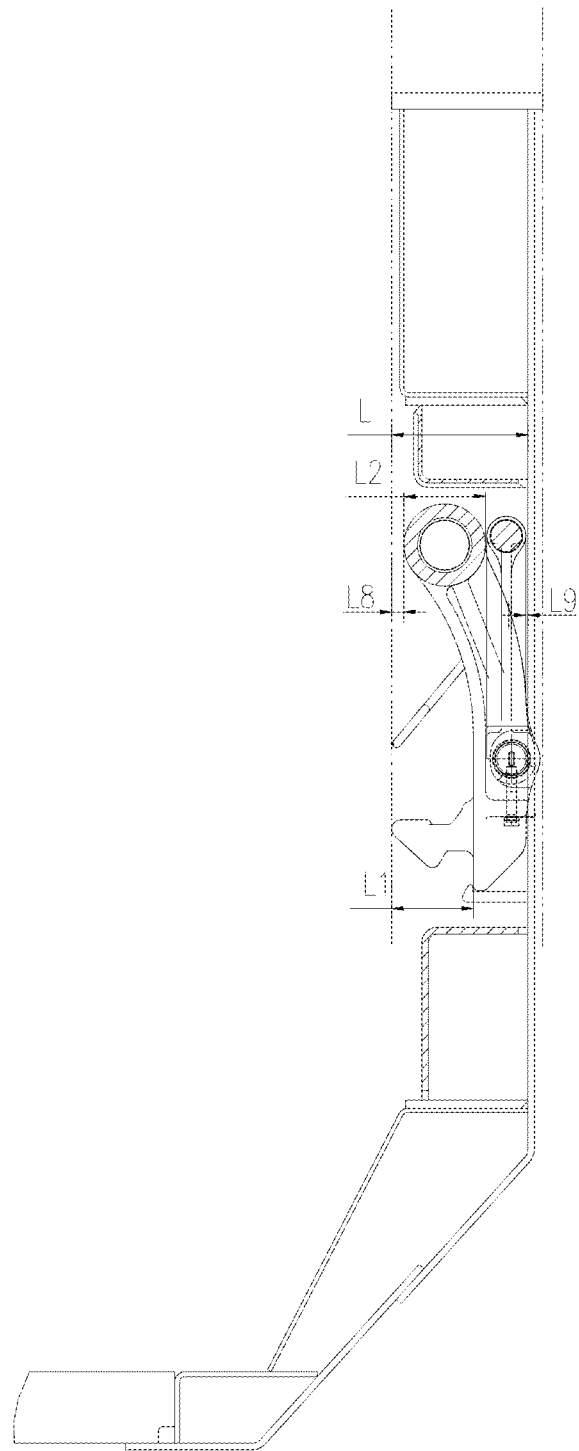
FIG. 4 shows a schematic diagram of the dimensional relationship of the container locking device of FIG. 2.

As shown in FIGS. 3 and 4, the embodiments of the present disclosure define the structural dimensions and parameter relationships of the container locking device. Specifically, as the length, width and height of containers of specifications and models such as 20 ft container and 40 ft container and the positioning dimensions of corner fittings of the containers have been specified in the existing national standards, a fixing position for the locking head 22 is determined. In order to ensure that the cantilever of the locking structure 20 is shortest and the bearing force of the locking head 22 is uniform, the dimension $L3$ of the distance from the rotation center of the locking structure 20 to the locking head 22 is reduced as much as possible, the dimension $L4$ of the distance from the locking head 22 to the rotation center of support structure is as small as possible, and the length dimension $L5$ of the support structure 30 should be as small as possible. Moreover, the dimension $L2$ of the profile face 24 of the locking structure 20 should be as large as possible, the thickness dimension $L6$ of the support structure 30 should be as large as possible, and the thickness dimension $L7$ of the support face of the locking structure 20 should be as large as possible. In addition, it should be ensured that $L \geq L2+L6$ and $L \geq L1+L7+L6$. In addition, considering manufacturing and assembly factors such as the piggyback transport vehicle, the support 10, the locking structure 20 and the support structure 30, the dimension $L8$ of the distance from the profile face 24 of the locking structure 20 to the inner wide plane of the inner side of the concave chassis 1 and the dimension $L9$ of the distance from the support structure 30 to the inner plane of the first side plate 11 should have margins. By comprehensively considering various relevant spatial dimensions $L, L1, L2, \ldots, L9$ of the container locking device, balancing points of the various relevant spatial dimensions are rationally determined, so that the structure of the container locking device is optimized, the weight of the container locking device is reduced, and the safety and reliability of use in the service life of the piggyback transport vehicle are ensured. The structure of the concave chassis 1 of the multifunctional piggyback transport vehicle determines the allowable maximum width dimension of the concave chassis 1 according to the vehicle limits of railway locomotives, and the outermost width limit is the first side plate 11 of the concave chassis. In consideration of the bearing strength of the side beam, the vehicle inner width should ensure a maximum inner width of the vehicle, so as to facilitate the loading and unloading of wheeled vehicles or containers, i.e. optimizing the structure of the inward-overturning container locking device in cases where the width dimension $L$ of the side beam of the vehicle and the height dimension $L1$ of the locking head of a turnover lock have been determined.

Alternatively, the piggyback transport vehicle provided in some embodiments of the present disclosure may be used to transport 20 ft containers, 40 ft containers, highway semi-trailers and highway trucks.

The described content merely relates to preferable embodiments of the present disclosure and is not intended to limit some embodiments of the present disclosure. For a person skilled in the art, some embodiments of the present disclosure may have various modifications and variations. Any modifications, equivalent replacements, improvements, etc. made within the spirit and principle of some embodiments of the present disclosure shall all belong to the scope of protection of some embodiments of the present disclosure.

What is claimed is:

1. A container locking device, comprising:
   a support, being provided with an accommodating space;
   a locking structure, a first end of the locking structure being hinged with the support, the locking structure having a locking position extending out of the accommodating space and an avoiding position retracted into the accommodating space; and a support structure, a first end of the support structure being hinged with a second end of the locking structure; wherein in a direction away from the locking structure, the support structure has a retraction position and a support position which cooperates with the support; when the locking structure is located at the locking position, the support structure is located at the support position and the locking structure is caused to stay at the locking position; and when the locking structure is located at the avoiding position, the support structure is located at the retraction position and is retracted into the accommodating space;

the support is provided with a clamping groove in communication with the accommodating space, and the clamping groove is located below the first end of the support structure; and when the support structure is located at the support position, a second end of the support structure is snap-fitted with the clamping groove, and the first end of the locking structure, the first end of the support structure and the second end of the support structure form a triangle.

2. The container locking device as claimed in claim 1, wherein the support further comprises a guide groove in communication with the clamping groove, and the guide groove extends along a movement trajectory of the second end of the support structure.

3. The container locking device as claimed in claim 2, wherein the support comprises a first side plate and two second side plates, the two second side plates are provided on the first side plate at an interval in a first direction, and the first side plate and the two second side plates enclose the accommodating space;

the container locking device further comprises a first rotary shaft, two ends of the first rotary shaft being respectively connected to the two second side plates;

the first end of the locking structure is provided with a first mounting hole, and the locking structure is pivotably sleeved on the first rotary shaft through the first mounting hole; and a locking head cooperating with a container is provided on a surface, away from the first side plate, of the second end of the locking structure.

4. The container locking device as claimed in claim 3, wherein two first assembly holes are provided, each of the two second side plates is provided with one first assembly hole of the two first assembly holes, and two ends of the first rotary shaft respectively penetrate through the two first assembly holes; a limiting groove extending in a radial direction of the first rotary shaft is provided on an outer circumferential surface of the first rotary shaft; and the container locking device further comprises a clamping plate fitting the limiting groove, at least a part of the clamping plate extends into the limiting groove, and the clamping plate is connected with one second side plate of the two second side plates by a first connecting member, so that the first rotary shaft is fixedly connected with the support.

5. The container locking device as claimed in claim 3, wherein a groove is provided on a surface, close to the first side plate, of the locking structure, and the groove is usable for accommodating the support structure; two second assembly holes are provided, a first connecting hole is provided on a first groove side wall, away from the first mounting hole, of the groove, and one of the two second assembly holes is provided on each of two second groove side walls, provided in the first direction, of the groove; the locking device further comprises:

a second rotary shaft, two ends of the second rotary shaft respectively penetrating through the two second assembly holes, and a second connecting hole provided opposite to the first connecting hole being provided on an outer peripheral wall of the second rotary shaft; and a second connecting member, the second connecting member penetrating through the first connecting hole and the second connecting hole, so that the second rotary shaft is fixedly connected with the locking structure;

the first end of the support structure is provided with a second mounting hole, and the support structure is pivotably sleeved on the second rotary shaft through the second mounting hole; and an avoiding hole for avoiding the second connecting member is provided on a hole wall of the second mounting hole.

6. The container locking device as claimed in claim 5, wherein the avoiding hole is fan-shaped.

7. The container locking device as claimed in claim 5, wherein a rotation hole is provided on an axial end face of the second rotary shaft, and a hole wall face of the rotation hole comprises a transmission plane to drive, through the rotation hole, the second rotary shaft to rotate, so that the second connecting hole is provided opposite to the first connecting hole.

8. The container locking device as claimed in claim 5, wherein the support further comprises:

vertical plates, one of the vertical plates being provided on each of surfaces, opposite to each other, of the two second side plates, and each of the vertical plates being provided with the clamping groove and the guide groove; there are two clamping grooves and two guide grooves provided;

wherein two support columns are provided at the second end of the support structure, and the two support columns respectively cooperate with the two guide grooves; the two support columns respectively cooperate with the two clamping grooves.

9. The container locking device as claimed in claim 8, wherein the support further comprises an upper cover plate, the upper cover plate being connected to top ends of the two second side plates and a top end of the first side plate; a distance is provided between top ends of the vertical plates and the upper cover plate;

the first side plate is provided with an avoiding hole for avoiding the locking structure and the support structure;

a groove bottom wall of each of the guide grooves is of arc-shaped, and with respect to the clamping grooves, the guide grooves are provided closer to the first side plate;

each of the vertical plates comprises an anti-detachment boss, the anti-detachment boss being located at a groove opening of the clamping groove and located at a side away from the first side plate; and after the support structure moves to the support position, the anti-detachment bosses prevent the support columns from being detached from the clamping grooves.

10. The container locking device as claimed in claim 1, wherein the locking structure is provided with a first handle hole and a second handle hole; the support structure is provided with a third handle hole and a fourth handle hole; the first handle hole and the second handle hole are both elongated holes;

the container locking device further comprises a handle, and the handle comprises a first handle segment and a second handle segment arranged symmetrically; the first handle segment passes through the first handle hole and the third handle hole, a first end of the first handle segment passes through the first handle hole and then extends in a bending manner, and a second end of the first handle segment passes through the third handle hole and then extends in a bending manner; and the second handle segment passes through the second handle hole and the fourth handle hole, a first end of the second handle hole passes through the second handle hole and then extends in a bending manner, and is connected to the first end of the first handle hole to enclose a grasping space, and a second end of the second handle segment passes through the fourth handle hole and then extends in a bending manner.

11. The container locking device as claimed in claim 3, wherein the container locking device further comprises a blocking structure, the blocking structure is connected to the first side plate, and the blocking structure comprises a snap-fit; and when the locking structure is located at the avoiding position, the snap-fit is snap-fitted with the second end of the locking structure, so that the locking structure stays at the avoiding position, and the support structure is located between the locking structure and the first side plate.

12. A piggyback transport vehicle, wherein the piggyback transport vehicle comprises:

a concave chassis, the concave chassis comprising a plurality of container locking devices as claimed in claim 1; the concave chassis has a loading space for loading containers or wheeled vehicles; the plurality of container locking devices are symmetrically arranged at two sides of the loading space, and a plurality accommodating spaces of the plurality of container locking devices are all in communication with the loading space;

when the locking structure of the container locking device is located at the locking position, the second end of the locking structure extends out of the accommodating space and extends into the loading space, and the loading space is used for loading containers; and when the locking structure of the container locking device is located at the avoiding position, the second end of the locking structure is retracted into the accommodating space from the loading space, and the loading space is used for loading wheeled vehicles.

* * * * *